United States Patent
Schmalstieg et al.

(10) Patent No.: US 11,069,128 B2
(45) Date of Patent: *Jul. 20, 2021

(54) RENDERING AN IMAGE FROM COMPUTER GRAPHICS USING TWO RENDERING COMPUTING DEVICES

(71) Applicant: QUALCOMM Incorporated, San Diego, CA (US)

(72) Inventors: Dieter Schmalstieg, Graz (AT); Gerhard Reitmayr, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/640,705

(22) PCT Filed: Jul. 24, 2018

(86) PCT No.: PCT/US2018/043575
§ 371 (c)(1),
(2) Date: Feb. 20, 2020

(87) PCT Pub. No.: WO2019/040221
PCT Pub. Date: Feb. 28, 2019

(65) Prior Publication Data
US 2020/0184712 A1 Jun. 11, 2020

Related U.S. Application Data

(63) Continuation of application No. 15/683,613, filed on Aug. 22, 2017, now Pat. No. 10,403,032.

(51) Int. Cl.
*G06T 15/40* (2011.01)
*G06T 15/00* (2011.01)
(Continued)

(52) U.S. Cl.
CPC ............ *G06T 15/405* (2013.01); *A63F 13/50* (2014.09); *G06T 1/60* (2013.01); *G06T 15/005* (2013.01);
(Continued)

(58) Field of Classification Search
None
See application file for complete search history.

(56) References Cited

U.S. PATENT DOCUMENTS

| 10,403,032 B2 | 9/2019 | Schmalstieg et al. | |
| 2002/0097408 A1* | 7/2002 | Chang | H04W 8/005 358/1.6 |

(Continued)

FOREIGN PATENT DOCUMENTS

| EP | 3046079 A1 | 7/2016 |
| EP | 3166078 A1 | 5/2017 |
| GB | 2506727 A | 4/2014 |

OTHER PUBLICATIONS

Andersson et al., "Adaptive Texture Space Shading for Stochastic Rendering", Computer Graphics Forum Proceedings of Eurographics Apr. 2014, 10 pp.

(Continued)

*Primary Examiner* — Michelle Chin
(74) *Attorney, Agent, or Firm* — Campbell Chiang; Shumaker & Sieffert P.A.

(57) ABSTRACT

An example system includes a first computing device comprising a first graphics processing unit (GPU) implemented in circuitry, and a second computing device comprising a second GPU implemented in circuitry. The first GPU is configured to perform a first portion of an image rendering process to generate intermediate graphics data and send the intermediate graphics data to the second computing device. The second GPU is configured to perform a second portion of the image rendering process to render an image from the (Continued)

intermediate graphics data. The first computing device may be a video game console, and the second computing device may be a virtual reality (VR) headset that warps the rendered image to produce a stereoscopic image pair.

28 Claims, 7 Drawing Sheets

(51) Int. Cl.
*G06T 15/04* (2011.01)
*G06T 15/10* (2011.01)
*G06T 15/80* (2011.01)
*G06T 17/20* (2006.01)
*G06T 1/60* (2006.01)
*A63F 13/50* (2014.01)

(52) U.S. Cl.
CPC .............. *G06T 15/04* (2013.01); *G06T 15/10* (2013.01); *G06T 15/80* (2013.01); *G06T 17/20* (2013.01); *A63F 2300/203* (2013.01); *A63F 2300/8082* (2013.01); *G06T 2200/16* (2013.01); *G06T 2200/24* (2013.01)

(56) References Cited

U.S. PATENT DOCUMENTS

| | | | |
|---|---|---|---|
| 2002/0097416 | A1* | 7/2002 | Chang ................... G06F 3/1245 358/1.13 |
| 2006/0050319 | A1* | 3/2006 | Suzuki ................... G06K 15/02 358/3.24 |
| 2009/0284535 | A1* | 11/2009 | Pelton ................... G06T 15/005 345/505 |
| 2010/0134494 | A1 | 6/2010 | Lim et al. |
| 2011/0149072 | A1 | 6/2011 | McCormack |
| 2011/0304634 | A1 | 12/2011 | Urbach |
| 2013/0124187 | A1 | 5/2013 | Qin |
| 2013/0286034 | A1* | 10/2013 | Diard ....................... G09G 5/02 345/589 |
| 2014/0075060 | A1* | 3/2014 | Sharp ........................ G06T 1/60 710/57 |
| 2014/0176549 | A1 | 6/2014 | Uralsky |
| 2014/0267259 | A1 | 9/2014 | Frascati et al. |
| 2015/0154051 | A1* | 6/2015 | Kruglick ................. H04L 67/38 345/522 |
| 2015/0287158 | A1* | 10/2015 | Cerny ....................... G09G 5/14 345/553 |
| 2015/0287230 | A1 | 10/2015 | Cerny |
| 2015/0347107 | A1 | 12/2015 | Munshi et al. |
| 2016/0212370 | A1 | 7/2016 | Lee et al. |
| 2016/0240000 | A1 | 8/2016 | Fishwick |
| 2017/0011487 | A1 | 1/2017 | Billyard |
| 2017/0115728 | A1 | 4/2017 | Park et al. |
| 2017/0150127 | A1 | 5/2017 | High et al. |
| 2017/0155885 | A1* | 6/2017 | Selstad ................. H04N 13/344 |
| 2017/0329395 | A1* | 11/2017 | Flordal .................. H04N 19/42 |
| 2018/0108169 | A1 | 4/2018 | Miller |
| 2018/0357794 | A1 | 12/2018 | Young et al. |

OTHER PUBLICATIONS

Burns et al., "A Lazy Object-Space Shading architecture With Decoupled Sampling", In Proceedings of the Conference on High Performance Graphics, Eurographics Association 2010, Aire-la-Ville, Switzerland, Switzerland, HPG '10, 10 pp. (Applicant points out, in accordance with MPEP 609.04(a), that the year of publication, 2010, is sufficiently earlier than the effective U.S. filing date, so that the particular month of publication is not in issue.).

Carr., et al., "Meshed Atlases for Real-Time Procedural Solid Texturing", University of Illinois, Urbana-Champaign, ACM Transactions on Graphics, vol. 21, No. 2, Apr. 2002, 26 pp.

Clarberg., et al., "A Sort-based Deferred Shading Architecture for Decoupled Sampling", ACM Transactions on Graphics (Proceedings of SIGGRAPH 2013) 2013, vol. 32, No. 4, art 141, Jul. 2013, 10 pp.

Clarberg., et al., "AMFS: Adaptive Multi-Frequency Shading for Future Graphics Processors", ACM Transactions on Graphics (Proceedings of SIGGRAPH 2014), vol. 33(4), Aug. 2014, 12 pp.

Cohen-Or., et al., "Deep Compression for Streaming Texture Intensive Animations" Proceedings of the SIGGRAPH 1999 annual conference on Computer graphics, Jul. 1999, 7 pp.

Dachsbacher C: "Analyzing Visibility Configurations," IEEE Transactions on Visualization and Computer Graphics, IEEE Service Center, Los Alamitos, CA, US, vol. 17 (4), Apr. 1, 2011, pp. 475-486, XP011373240, ISSN: 1077-2626, DOI: 10.1109/TVCG.2010.77.

Decoret., et al., "Multilayered Impostors for Accelerated Rendering", Computer Graphics Forum, The Eurographics Association and Blackwell Publishers 1999, 18(3):61-73, 1999, 13 pp. (Applicant points out, in accordance with MPEP 609.04(a), that the year of publication, 1999, is sufficiently earlier than the effective U.S. filing date, so that the particular month of publication is not in issue.).

Ellis., et al., "SVGPU: Real Time 3D Rendering to Vector Graphics Formats", High Performance Graphics (2016), The Eurographics Association 2016, 9 pp. (Applicant points out, in accordance with MPEP 609.04(a), that the year of publication, 2016, is sufficiently earlier than the effective U.S. filing date, so that the particular month of publication is not in issue.).

Fatahalian K., et al., "Reducing Shading on GPUs Using Quad-Fragment Merging", ACM SIGGRAPH 2010 Papers, ACM, 2 Penn Plaza, Suite 701 New York, NY, 10121-0701, USA, Jul. 26, 2010 (Jul. 26, 2010), XP058312485, pp. 1-8.

Guenter B., et al., "Foveated 3D Graphics", ACM Transactions on Graphics, vol. 31, No. 6, Nov. 2012 (Nov. 2012), 10 Pages, XP055199808, ISSN: 0730-0301, DOI: 10.1145/2366145.2366183, abstract; figures 1,3, p. 164:1, col. 2, section 4.

Halle, "Multiple Viewpoint Rendering", Proceedings of the ACM SIGGRAPH Conference on Computer Graphics, 1998, 12 pp. (Applicant points out, in accordance with MPEP 609.04(a), that the year of publication, 1998, is sufficiently earlier than the effective U.S. filing date, so that the particular month of publication is not in issue.).

Harada., et al., "Forward+: Bringing Deferred Lighting to the Next Level", Advanced Micro Devices, Inc., Computer Graphics forum, vol. 0 (1981), No. 0, 2012 The Eurographics Association and Blackwell Publishing Ltd., 4 pp. (Applicant points out, in accordance with MPEP 609.04(a), that the year of publication, 1981, is sufficiently earlier than the effective U.S. filing date, so that the particular month of publication is not in issue.).

Hasselgren., et al., "An Efficient Multi-View Rasterization Architecture," Proceedings of the 17th Eurographics Conference on Rendering Techniques, Jun. 26, 2006, 12 pp.

Hasselgren., et al., "Efficient Depth Buffer Compression", Proceeding GH '06 of the 21st ACM SIGGRAPH/ EUROGRPAHISC Symposium on Graphics Hardware, 2006, The Eurographics Association 2006, 8 pp. (Applicant points out, in accordance with MPEP 609.04(a), that the year of publication, 2006, is sufficiently earlier than the effective U.S. filing date, so that the particular month of publication is not in issue.).

He Y., et al., "Extending the Graphics Pipeline with Adaptive, Multi-Rate Shading", ACM Transactions on Graphics (TOG), ACM, US, vol. 33, No. 4, Jul. 27, 2014 (Jul. 27, 2014), XP058051920, pp. 1-12.

Hillesland., et al., "Texel Shading", Advanced Micro Devices, Inc., Eurographics Proceedings, The Eurographics Association, Jul. 2016, 4 pp.

IEEE 802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, pp. 628.

(56) References Cited

OTHER PUBLICATIONS

International Search Report and Written Opinion—PCT/US2018/043575—ISA/EPO—dated Nov. 26, 2018.
"Efficient Hybrid Image Warping for High Frame-Rate Stereoscopic Rendering", IEEE Transactions on Visulaization and Computer Graphics, Jan. 25, 2017, vol. 23, Issue 4, Apr. 2017, 10 pp.
Lengyel J., et al., "Rendering With Coherent Layers", SIGGRAPH '97 Proceedings of the 24th annual conference on Computer graphics and interactive techniques, Aug. 3, 1997, XP000765821, pp. 233-242.
Liktor., et al., "Decoupled Deferred Shading for Hardware Rasterization", Computer Graphics Group/Karlsruhe Institute of Technology, Proceedings of the 2012 Symposium on Interactive 3D Graphics and Games, Mar. 9, 2012, 8 Pages.
Lochman., et al., "Real-time Reflective and Refractive Novel-view Synthesis", Vision, Modeling and Visualization (2014), The Eurographics Association 2014, 8 pp. (Applicant points out, in accordance with MPEP 609.04(a), that the year of publication, 2014, is sufficiently earlier than the effective U.S. filing date, so that the particular month of publication is not in issue.).
Mara., et al., "Deep G-Buffers for Stable Global Illumination Approximation", High Performance Graphics (2016), Eurographics Proceedings, 2016 The Eurographics Association, Dec. 5, 2017, 15 pp.
Mark W.R., et al., "Post-Rendering 3D Warping," In Proceedings of 1997 Symposium on Interactive 3D Graphics, Providence, RI, Apr. 27-30, 1997, Department of Computer Science, University of North Carolina at Chapel Hill, pp. 1-10.
McGuire, et al., "Real-time Stochastic Rasterization on Conventional GPU Architectures," High Performance Graphics, Jun. 25-27, 2010, 10 pp.
Montine J.L., "Institute of Electrical and Electronics Engineers:" A Procedural Interface for Volume Rendering, Proceedings of the Conference on Visualization, San Francisco, Oct. 23-26, 19; [Proceedings of the Conference on Visualization], Los Alamitos, IEEE Comp. Soc. Press, US, vol. Conf. 1, Oct. 23, 1990, pp. 36-44, XP010021058, DOI: 10.1109/VISUAL.1990.146362, ISBN: 978-0-8186-2083-6.
Nilsson., et al., "Design and Novel Uses of Higher-Dimensional Rasterization", Eurographics Association, EGGH-HPG '12 Proceedings of the Fourth ACM SIGGRAPH / Eurographics Conference on High-Performance Graphics, Jun. 25, 2012, 11 pp.
Pajak., et al., "Scalable Remote Rendering with Depth and Motion-flow Augmented Streaming", Eurographics, vol. 30 (2011), No. 2, Mar. 2011, 10 pp.
Partial International Search Report—PCT/US2018/043575—ISA/EPO—dated Oct. 2, 2018.
Patney., et al., "Towards Foveated Rendering for Gaze-Tracked Virtual Reality", NVIDIA, ACM SA '16 Technical Papers, Macao, Dec. 5-8, 2016, 12 pp.
Ragan-Kelley., et al., "Decoupled Sampling for Graphics Pipelines", ACM Transactions on Graphics, vol. 30, Issue 3, Article No. 17, Mar. 2011, 17 pp.
Regan., et al., "Priority Rendering with a Virtual Reality Address Recalculation Pipeline", Computer Graphics Proceedings (SIGGRAPH 94), Jul. 1994, 8 pp.
Saito., et al., "Comprehensible Rendering of 3-D Shapes", Computer Graphics: Proc. SIGGRAPH 24:4 (Aug. 1990), 197-206, 10 pp.
Sitthi-Amorn et al., "An Improved Shading Cache for Modern GPUs", Proceedings of the 23rd ACM SIGGRAPH/EUROGRAPHICS symposium on Graphics Hardware, Sarajevo, Bosnia and Herzegovina, Jun. 20-21, 2008, 7 pp.
Sitthi-Amorn et al., "Automated Reprojection-Based Pixel Shader Optimization", ACM SIGGRAPH Conference Proceedings, ACM Trans. Graph. 27 (2008): 127:1-127:11, 10 pp. Applicant points out, in accordance with MPEP 609.04(a), that the year of publication, 2008, is sufficiently earlier than the effective U.S. filing date, so that the particular month of publication is not in issue.).
Snyder., et al., "Visibility Sorting and Compositing Without Splitting for Image Layer Decompositions", In Proceedings of the 25th annual conference on Computer graphics and interactive techniques (SIGGRAPH '98), Jan. 1998, 12 pp.
Sun et al., "An Overview of Free Viewpoint Depth-Image-Based Rendering (DIBR)", The Hong Kong University of Science and Technology, Proceedings of the Second APSIPA Annual Summit and Conference, Biopolis, Singapore, Dec. 14-17, 2010, 8 pp.
U.S. Appl. No. 15/685,770, filed Aug. 24, 2017 with first named inventor Dieter Schmalstieg.
Vaidyanathan K., et al., "Coarse Pixel Shading," High Performance Graphics, Intel Corporation, Lund University, The Eurographics Association, Jun. 2014, 10 pp.
Yang., et al., "Amortized Supersampling", [online] [Retrieved on Mar. 10, 2017]; Retrieved from the Internet URL: http://www.cs.virginia.edu/gfx/pubs/Yang-2009-AMS/yang2009.pdf, 12 pp.
Baxter, III W.V., et al., "GigaWalk: Interactive Walkthrough of Complex Environments", Eurographics Rendering Workshop, 2002, Jul. 1, 2002, XP002784998, 15 pages.

\* cited by examiner

1. PUSH STAGE  2. PULL STAGE

DIAGONAL DIFFUSION

VERT/HORIZ DIFFUSION

RENDERING AN IMAGE FROM COMPUTER GRAPHICS USING TWO RENDERING COMPUTING DEVICES

This application claims priority to International Application No. PCT/US2018/043575, filed Jul. 24, 2018, which claims the benefit of U.S. application Ser. No. 15/683,613 filed Aug. 22, 2017. The entire contents of each of which are hereby incorporated by reference.

TECHNICAL FIELD

This disclosure relates to rendering an image from computer graphics data.

BACKGROUND

Visual content for display, such as content for graphical user interfaces and video games, may be generated by a graphics processing unit (GPU). A GPU may convert two-dimensional or three-dimensional (3D) objects defined by graphical primitives (e.g., points, lines, and triangles) into a two-dimensional (2D) pixel bit representation, such as a bit map, that may be displayed. Converting 3D object information into a bit map that can be displayed is known as pixel rendering, and requires considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like.

Three-dimensional display technologies are now being used to provide 3D content for virtual reality (VR) and augmented reality. For example, a VR headset may include two displays, a left-eye display and a right-eye display, to present a stereoscopic image pair to a wearer of the VR headset, to produce a 3D effect from the image pair. In general, the VR headset may produce the 3D effect by presenting images from slightly different horizontal perspectives, which simulates the horizontal offset between a user's eyes for binocular vision. In this manner, the VR headset presents the stereoscopic image pair to cause the user's visual system to perceive the two images in 3D.

SUMMARY

In general, this disclosure describes techniques for rendering an image from computer graphics data. In particular, according to the techniques of this disclosure, two computing devices, e.g., a source device such as a video game console, personal computer, smart phone, tablet computer, or the like, and a destination device such as a virtual reality (VR) headset, may each perform parts of an image rendering process. In particular, a graphics processing unit (GPU) of the first device may perform a first portion of an image rendering process to generate intermediate graphics data, and then send the intermediate graphics data to a GPU of the second device. The GPU of the second device may then finish rendering the intermediate graphics data to generate one or more images. In the case of VR, augmented reality (AR), or other such three-dimensional (3D) playback scenarios, the GPU of the second device may also perform steps that are specific to VR/AR rendering, such as warping the rendered image to produce a stereoscopic image pair, e.g., using depth information included in data received from the first device, optics distortion correction, or time warping to compensate latency.

In one example, a method of generating computer graphics includes performing, by a first graphics processing unit (GPU) of a first computing device, a first portion of an image rendering process to generate intermediate graphics data, sending, by the first computing device, the intermediate graphics data to a second computing device, and performing, by a second GPU of the second computing device, a second portion of the image rendering process to render an image from the intermediate graphics data.

In another example, a system for generating computer graphics includes a first computing device comprising a first graphics processing unit (GPU) implemented in circuitry, and a second computing device comprising a second GPU implemented in circuitry. The first GPU is configured to perform a first portion of an image rendering process to generate intermediate graphics data and send the intermediate graphics data to the second computing device. The second GPU is configured to perform a second portion of the image rendering process to render an image from the intermediate graphics data.

In another example, a system for generating computer graphics includes a first computing device and a second computing device. The first computing device includes means for performing a first portion of an image rendering process of a graphics processing unit (GPU) pipeline to generate intermediate graphics data and means for sending the intermediate graphics data to the second computing device. The second computing device includes means for performing a second portion of the image rendering process of the GPU pipeline to render an image from the intermediate graphics data.

In another example, a computer-readable storage medium has stored thereon instructions that, when executed, cause a second graphics processing unit (GPU) of a second computing device to receive intermediate graphics data from a first computing device generated by a first GPU of the first computing device during a first portion of an image rendering process, and perform a second portion of the image rendering process to render an image from the intermediate graphics data.

The details of one or more examples are set forth in the accompanying drawings and the description below. Other features, objects, and advantages will be apparent from the description and drawings, and from the claims.

DETAILED DESCRIPTION

Figure 1:
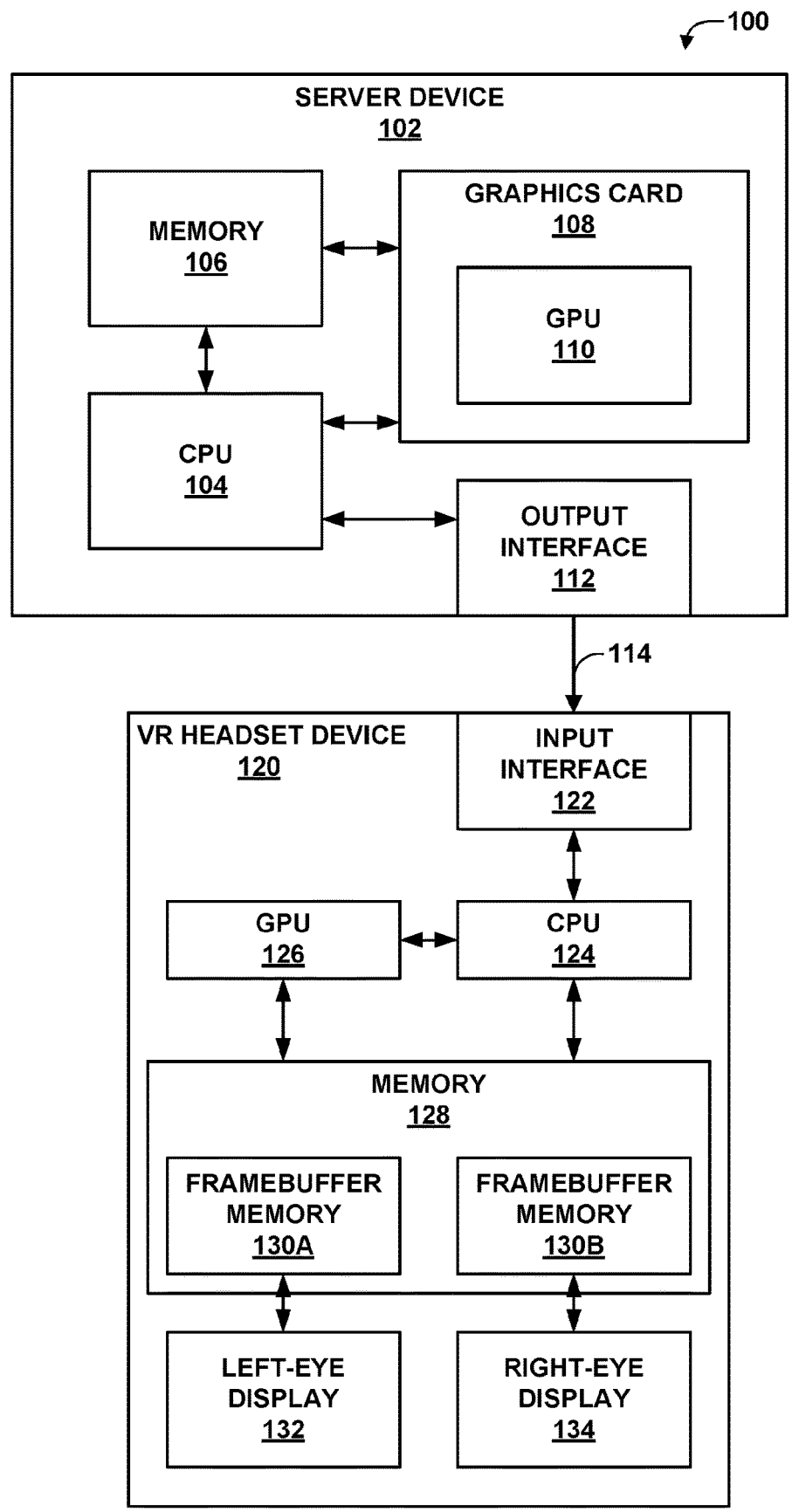
FIG. 1 is a block diagram illustrating an example system including two computing devices, a server device and a virtual reality (VR) headset device, that may perform the techniques of this disclosure.

FIG. 1 is a block diagram illustrating an example system 100 including two computing devices, server device 102 and virtual reality (VR) headset device 120, that may perform the techniques of this disclosure. Server device 102 includes central processing unit (CPU) 104, memory 106, graphics card 108, and output interface 112. Graphics card 108 includes graphics processing unit 110. VR headset device 120 includes input interface 122, CPU 124, GPU 126, memory 128, left-eye display 132, and right-eye display 134. Memory 128 includes framebuffer memories 130A, 130B (framebuffer memories 130). Although not shown in the example of FIG. 1, server device 102 may also include or be coupled to one or more displays.

Server device 102 is referred to as a "server" in the sense that server device 102 provides intermediate graphics data to VR headset device 120 via communication medium 114. Communication medium 114 may correspond to a physical communication medium, such as a universal serial bus (USB) cable, high-definition multimedia interface (HDMI) cable, or a DisplayPort cable, or a wireless communication medium, such as Bluetooth or WiFi according to IEEE 802.11. Server device 102 may correspond to, for example, a video game console, a personal computer, smart phone, or tablet computing device executing a video game or other three-dimensional (3D) graphics program.

VR headset device 120 represents an example of a VR headset for presenting stereoscopic image pairs to a wearer of VR headset device 120. The stereoscopic image pair may include a left-eye image, which VR headset device 120 presents via left-eye display 132, and a right-eye image, which VR headset device 120 presents via right-eye display 134.

CPUs 104, 124 may be implemented in circuitry (e.g., digital logic circuitry). CPUs 104, 124 may also represent single respective processors, or multi-processor (e.g., multi-core) CPUs. CPUs 104, 124 may further include internal cache memory, e.g., any or all of an L1, L2, and/or L3 caches, and/or additional caches.

CPU 104 may execute a computer graphics-generating program, such as a video game, ray tracing program, animation program, or the like. CPU 104 may generate one or more graphics primitives (e.g., vertices, lines, triangles, or the like), as well as characteristics for objects defined by the primitives (e.g., texture images to be applied to the objects, position data defining relative positions of the objects, illumination characteristics, etc.), through generation of this graphics program. CPU 104 may also define one or more camera positions, generally corresponding to the position of the screen/display at which images rendered from the graphics primitives are to appear. Such generated data may generally be referred to as graphics data.

CPU 104 may then send the graphics data to graphics card 108 for rendering. CPU 104 may send the graphics data to graphics card 108 directly, or may store some or all of the graphics data to memory 106 and cause graphics card 108 to retrieve the graphics data from memory 106 (e.g., by storing the graphics data to a region of memory 106 allocated to graphics card 108). In some examples, a CPU and GPU, such as CPU 104 and GPU 110, may form part of a system on a chip (SoC), which may perform the techniques of this disclosure.

Graphics card 108 may cause GPU 110 to initiate a rendering process to begin rendering an image from the graphics data. In accordance with the techniques of this disclosure, GPU 110 may perform only a first part of an image rendering process, e.g., a graphics processing pipeline (also referred to simply as a graphics pipeline). The graphics processing pipeline generally includes various stages, such as an application stage (performed by CPU 104, in this example), a geometry stage, a rasterization stage, and a framebuffer stage.

In accordance with the techniques of this disclosure, GPU 110 may perform only the geometry stage and the rasterization stage of a graphics processing pipeline. Performance of these stages may result in intermediate graphics data, which GPU 110 may store to a graphics buffer (G-buffer), e.g., of memory 106. The intermediate graphics data may include texture data for graphics objects defined by the graphics primitives and/or the graphics primitives themselves and depth data for the graphics objects. In some examples, the texture data may include an image, or information used to render an image. In some examples, the intermediate graphics data may additionally include one or more of position data for the graphics objects and/or graphics primitives, normals data for the graphics objects and/or graphics primitives, albedo data for the graphics objects and/or graphics primitives, and/or a specular component for the graphics objects and/or graphics primitives. In some examples, GPU 110 or CPU 104 may compress the intermediate graphics data prior to storing the intermediate graphics data to the G-buffer.

Output interface 112 may then send the intermediate graphics data (i.e., the G-buffer data) to VR headset device 120 via communication medium 114 via output interface 112. VR headset device 120 receives the intermediate graphics data via input interface 122. Output interface 112 and input interface 122 represent physical interfaces corresponding to communication medium 114. For example, when communication medium 114 is a cable, such as an HDMI or DisplayPort cable, output interface 112 and input interface 122 correspond to cable port interfaces for receiving the cable and for communicating via the cable. As another example, when communication medium 114 is a wireless medium, such as WiFi or Bluetooth, output interface 112 and input interface 122 correspond to wireless communication interfaces, such as WiFi transmitters/receivers or Bluetooth transmitters/receivers.

CPU 124 of VR headset device 120 may receive the intermediate graphics data from input interface 122 and send the intermediate graphics data to GPU 126. When the intermediate graphics data is compressed, CPU 124 and/or GPU 126 may decompress the intermediate graphics data prior to further processing. In accordance with the techniques of this disclosure, GPU 126 may be configured to perform a second (and final) portion of the graphics rendering process using the intermediate graphics data. For example, GPU 126 may execute one or more shaders to perform various shading passes, including a final shading pass (or final rendering pass), on the intermediate graphics data to ultimately render one or more images from the intermediate graphics data.

For example, GPU 126 may warp texture information of the intermediate graphics data, using depth information of the intermediate graphics data, to produce a stereoscopic image pair. GPU 126 may, for example, treat the texture information of the intermediate graphics data as a center view, and warp the texture information to a left-eye view and a right-eye view using the depth information. In some examples, GPU 126 may store the rendered (or warped) images to respective ones of framebuffer memories 130A, 130B. For example, GPU 126 may store the left-eye view image to framebuffer memory 130A and the right-eye view image to framebuffer memory 130B.

In some examples, GPU 126 may warp texture information of the intermediate graphics data to form a second, warped image, e.g., based on the depth data included in the intermediate graphics data. GPU 126 may store an image represented by the intermediate graphics data to one of framebuffer memories 130A, 130B, and store the warped image to the other one of framebuffer memories 130A, 130B. For example, GPU 126 may store the rendered image to framebuffer memory 130A, and the warped image to framebuffer memory 130B.

The images stored to framebuffer memories 130A, 130B constitute a stereoscopic image pair. Thus, VR headset device 120 may display the images of the stereoscopic image pair via left-eye display 132 and right-eye display 134. In the example of FIG. 1, VR headset device 120 displays images in framebuffer memory 130A via left-eye display 132 and images in framebuffer memory 130B via right-eye display 134.

In some examples, server device 102 and VR headset device 120 may be configured to perform foveated rendering. In foveated rendering, lens optics in VR headsets (such as lens optics of left-eye display 132 and right-eye display 134) enlarge peripheral image regions in a user's field of view. This disclosure recognizes that it is wasteful to render more pixels than will be used in the final image. Thus, GPUs according to this disclosure (such as GPUs 110, 126) may sample pixels in the center of an image relatively more densely than pixels in the periphery of the image. Deferred tiled rendering according to the techniques of this disclosure, explained in greater detail below with respect to FIG. 3, may simplify foveated rendering, as a suitable sampling density may be selected per tile.

Server device 102 may use a tiled deferred renderer (e.g., a standard game engine) and render an image into layered G-buffers. An example of tiled deferred rendering is explained in greater detail below with respect to FIG. 3. Layered image warping is described in greater detail below with respect to FIG. 5. Server device 102 may also defer shading with foveated rendering and separate buffers for diffuse and specular parts as explained below with respect to FIG. 5.

GPU 110 may perform red-green-blue-depth (RGBD) compression to compress image and depth data sent from output interface 112 to VR headset device 120 via communication medium 114. An example of RGBD compression is explained with respect to FIG. 6 below. However, other compression methods may be used as well. Output interface 112 may send a data stream to VR headset device 120 via communication medium 114, and update a rate per stream based on current disparities. VR headset device 120 may perform RGBD decompression as explained below with respect to FIG. 6.

VR headset device 120 (representing an example client device) may perform image warping using depth buffer tessellation and texture mapping. The tessellation may respect foveated sampling. VR headset device 120 may warp directly to a predistorted view for lens optics of left-eye display 132 and right-eye display 134. In particular, GPU 126 may perform separate warping for left-eye display 132 and right-eye display 134. A standard depth buffer may compose the layers in framebuffer memories 130A, 130B for correct presentation by left-eye display 132 and right-eye display 134.

In this manner, the techniques of this disclosure may combine GPU power from both server device 102 and VR headset device 120 (representing an example of a client device). GPU 110 of server device 102 may be more powerful than GPU 126 of VR headset device 120. The techniques of this disclosure may avoid the necessity of GPU 110 rendering both images and sending both images to VR headset device 120. Thus, the techniques of this disclosure may improve the processing efficiency of GPU 110, and reduce bandwidth consumed by transmissions via communication medium 114. These techniques may also avoid performance bottlenecks that may otherwise result from rendering the stereoscopic image pair images fully at server device 102, especially when such images are rendered at ultra-high resolutions (e.g., 4K resolution).

Moreover, some example techniques of this disclosure may be used to maintain more pixel-level information than RGB per frame on server device 102. Server device 102 may use the pixel-level information to transmit less raw image data to VR headset device 120 than in standard techniques. Likewise, server device 102 may use the pixel-level information to compress the information sent to VR headset device 120. Server device 102 may generally render intermediate graphics data for one image per frame (rather than stereo images). Server device 102 may extract RGB and depth data for the image and perform RGBD compression, e.g., as explained with respect to FIG. 6. VR headset device 120 may decompress the data using RGBD decompression as explained with respect to FIG. 6 and re-render an RGBD frame from two eye positions, potentially using lens distortion for left-eye display 132 and right-eye display 134, in a single pass.

Figure 2:
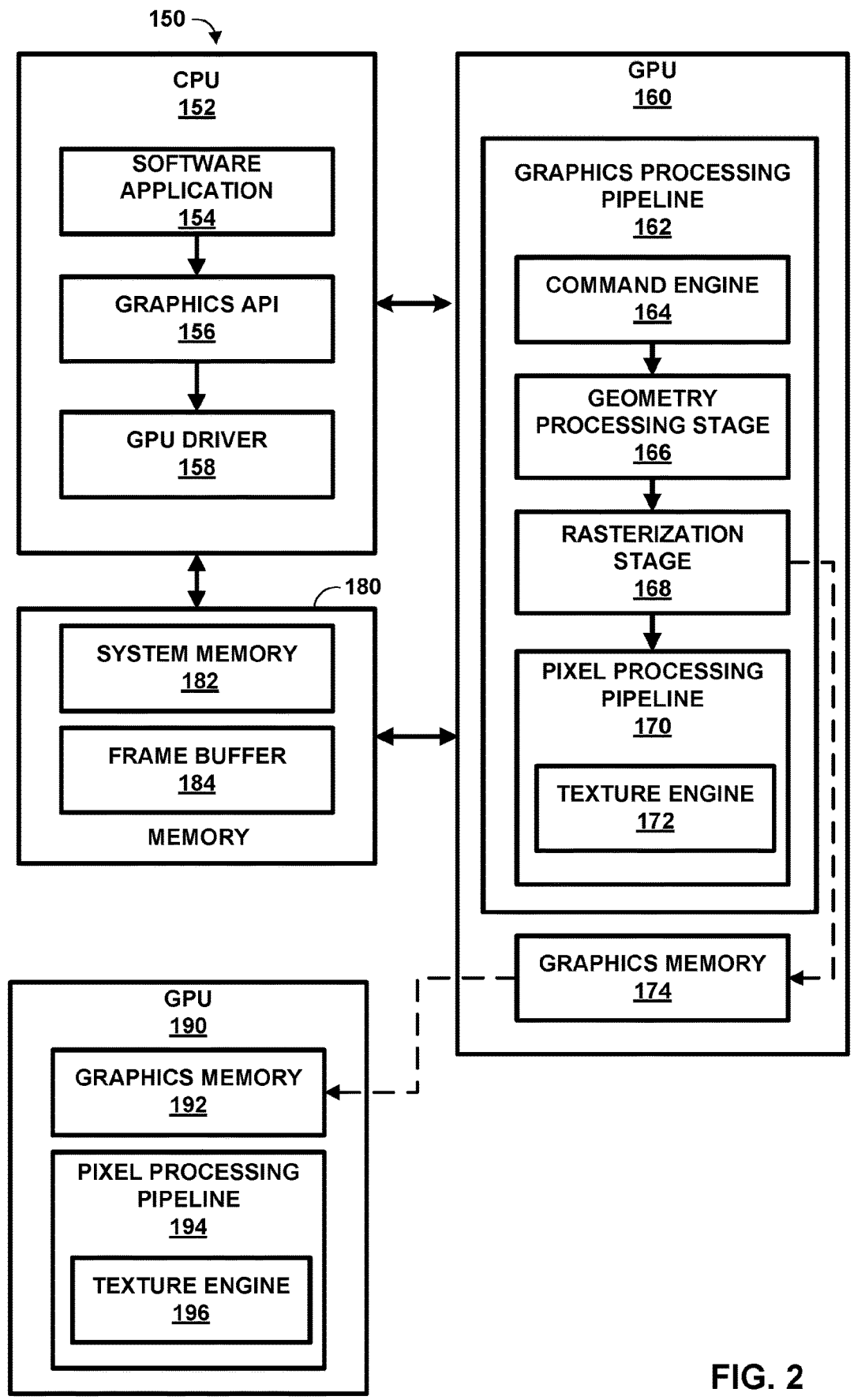
FIG. 2 is a block diagram illustrating a system including example implementations of a central processing unit (CPU), graphics processing units (GPUs), and memory.

FIG. 2 is a block diagram illustrating a system 150 including example implementations of CPU 152, GPU 160, memory 180, and GPU 190. In this example, CPU 152, GPU 160, and memory 180 are included in a server device, while GPU 190 is included in a client device. It should be understood that the client device may further include a CPU and memory as shown in FIG. 1, but the CPU and memory of the client device are not shown in FIG. 2, for ease of illustration. CPU 152, GPU 160, and memory 180 of FIG. 2 may correspond, respectively, to CPU 104, GPU 110, and memory 106 of FIG. 1, while GPU 190 of FIG. 2 may correspond to GPU 126 of FIG. 1.

In this example, CPU 152 executes software application 154, graphics API 156, and GPU driver 158, each of which may be one or more software applications or services. In this example, GPU 160 includes graphics processing pipeline 162 that includes a plurality of graphics processing stages that operate together to execute graphics processing commands. GPU 160 may be configured to execute graphics processing pipeline 162 in a variety of rendering modes, including a binning rendering mode and a direct rendering mode.

As shown in FIG. 2, graphics processing pipeline 162 may include command engine 164, geometry processing stage 166, rasterization stage 168, and pixel processing pipeline 170. Pixel processing pipeline 170 may include texture engine 172. Each of the components in graphics processing pipeline 162 may be implemented as fixed-function components, programmable components (e.g., as part of a shader program executing on a programmable shader unit), or as a combination of fixed-function and programmable components. Memory 180, available to CPU 152 and GPU 160, may include system memory 182 and frame buffer 184. Frame buffer 184 may be a part of system memory 182 or may be separate from system memory 182. Frame buffer 184 may store rendered image data.

Software application 154 may be any application that utilizes the functionality of GPU 160. For example, software application 154 may be a GUI application, an operating system, a portable mapping application, a computer-aided design program for engineering or artistic applications, a video game application, or another type of software application that may utilize a GPU. In some examples, software application 154 may represent a virtual reality (VR) application, e.g., a VR video game, or an augmented reality (AR) application. Thus, software application 154 may send data representing a user's viewpoint (determined using any or all of external cameras, accelerometers, gyroscopes, or the like) to GPU 160 via graphics API 156 and GPU driver 158. GPU 160, in turn, may use the viewpoint data to determine one or more camera positions (e.g., a single camera position for a single image, or multiple camera positions for two images, e.g., a left-eye image and a right-eye image).

Software application 154 may include one or more drawing instructions that instruct GPU 160 to render a graphical user interface (GUI) and/or a graphics scene. For example, the drawing instructions may include instructions that define a set of one or more graphics primitives to be rendered by GPU 160. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 154 may invoke GPU driver 158, via graphics API 156, to issue one or more commands to GPU 160 for rendering one or more graphics primitives into displayable graphics images. For example, software application 154 may invoke GPU driver 158, via graphics API 156, to provide primitive definitions to GPU 160. In some instances, the primitive definitions may be provided to GPU 160 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates.

The primitive definitions may also include primitive type information (e.g., triangle, rectangle, triangle fan, triangle strip, etc.), scaling information, rotation information, and the like. Based on the instructions issued by software application 154 to GPU driver 158, GPU driver 158 may formulate one or more commands that specify one or more operations for GPU 160 to perform in order to render the primitive. When GPU 160 receives a command from CPU 152, graphics processing pipeline 162 decodes the command and configures one or more processing elements within graphics processing pipeline 162 to perform the operation specified in the command. After performing the specified operations, graphics processing pipeline 162 outputs the rendered data to frame buffer 184 associated with a display device. Graphics processing pipeline 162 may be configured to execute in one of a plurality of different rendering modes, including a binning rendering mode and a direct rendering mode.

GPU driver 158 may be further configured to compile one or more shader programs, and to download the compiled shader programs onto one or more programmable shader units contained within GPU 160. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 160. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 162 may be configured to receive one or more graphics processing commands from CPU 152, via GPU driver 158, and to execute the graphics processing commands to generate displayable graphics images. As discussed above, graphics processing pipeline 162 includes a plurality of stages that operate together to execute graphics processing commands. It should be noted, however, that such stages need not necessarily be implemented in separate hardware blocks. For example, portions of geometry processing stage 166 and pixel processing pipeline 170 may be implemented as part of a unified shader unit. Again, graphics processing pipeline 162 may be configured to execute in one of a plurality of different rendering modes, including a binning rendering mode and a direct rendering mode.

Command engine 164 may receive graphics processing commands and configure the remaining processing stages within graphics processing pipeline 162 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 164 may cause geometry processing stage 166 to perform geometry processing with respect to vertices and/or primitives associated with one or more received commands.

Geometry processing stage 166 may perform per-vertex operations and/or primitive setup operations on one or more vertices in order to generate primitive data for rasterization stage 168. Each vertex may be associated with a set of attributes, such as, e.g., positional coordinates, color values, a normal vector, and texture coordinates. Geometry processing stage 166 modifies one or more of these attributes according to various per-vertex operations. For example, geometry processing stage 166 may perform one or more transformations on vertex positional coordinates to produce modified vertex positional coordinates.

Geometry processing stage 166 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 166 may also perform per-vertex lighting operations on the vertices to generate modified color coordinates for the vertices. Geometry processing stage 166 may also perform other operations including, e.g., normal transformations, normal normalization operations, view volume clipping, homogenous division and/or backface culling operations.

Geometry processing stage 166 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 162. Conceptually, each vertex may correspond to a corner of a primitive where two edges of the primitive meet. Geometry processing stage 166 may provide the primitive data to rasterization stage 168 for further processing.

In some examples, all or part of geometry processing stage 166 may be implemented by one or more shader programs executing on one or more shader units. For example, geometry processing stage 166 may be implemented, in such examples, by a vertex shader, a geometry shader or any combination thereof. In other examples, geometry processing stage 166 may be implemented as a fixed-function hardware processing pipeline or as a combination of fixed-function hardware and one or more shader programs executing on one or more shader units.

Rasterization stage 168 is configured to receive, from geometry processing stage 166, primitive data that represents a primitive to be rasterized, and to rasterize the primitive to generate a plurality of source pixels that correspond to the rasterized primitive. In some examples, rasterization stage 168 may determine which screen pixel locations are covered by the primitive to be rasterized, and generate a source pixel for each screen pixel location determined to be covered by the primitive. Rasterization stage 168 may determine which screen pixel locations are covered by a primitive by using techniques known to those of skill in the art, such as, e.g., an edge-walking technique, evaluating edge equations, etc. Rasterization stage 168 may provide the resulting source pixels to pixel processing pipeline 170 for further processing.

The source pixels generated by rasterization stage 168 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 168 to be covered by a primitive may conceptually include pixels that represent the vertices of the primitive, pixels that represent the edges of the primitive and pixels that represent the interior of the primitive.

Pixel processing pipeline 170 is configured to receive a source pixel associated with a rasterized primitive, and to perform one or more per-pixel operations on the source pixel. Per-pixel operations that may be performed by pixel processing pipeline 170 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 170 may execute one or more pixel shader programs to perform one or more per-pixel operations. The resulting data produced by pixel processing pipeline 170 may be referred to herein as destination pixel data and stored in frame buffer 184. The destination pixel data may be associated with a destination pixel in frame buffer 184 that has the same display location as the source pixel that was processed. The destination pixel data may include data such as, e.g., color values, destination alpha values, depth values, etc.

Texture engine 172 may be included as part of pixel processing pipeline 170. Texture engine 172 may include programmable and/or fixed function hardware designed to apply textures (texels) to pixels. Texture engine 172 may include dedicated hardware for performing texture filtering, whereby one or more texel values are multiplied by one or more pixel values and accumulated to produce the final texture mapped pixel.

Frame buffer 184 stores destination pixels for GPU 160. Each destination pixel may be associated with a unique screen pixel location. In some examples, frame buffer 184 may store color components and a destination alpha value for each destination pixel. For example, frame buffer 184 may store Red, Green, Blue, Alpha (RGBA) components for each pixel where the "RGB" components correspond to color values and the "A" component corresponds to a destination alpha value. Although frame buffer 184 and system memory 182 are illustrated as being separate memory units, in other examples, frame buffer 184 may be part of system memory 182.

GPU 160 also includes graphics memory 174, which may store a graphics buffer (G-buffer). In accordance with the techniques of this disclosure, GPU 160 may send output of rasterization stage 168 to the G-buffer of graphics memory 174, instead of to pixel processing pipeline 170. GPU 160 may then output the G-buffer data to GPU 190.

GPU 190 may generally include elements similar to those of GPU 160. For example, GPU 190 may include a graphics processing pipeline similar to graphics processing pipeline 162. For purposes of explanation, only pixel processing pipeline 194 is shown in this example, but it should be understood that GPU 190 may include components similar to the other components of GPU 160. GPU 190 also includes graphics memory 192, which may also include a G-buffer to buffer data from the G-buffer of graphics memory 174.

GPU 160 may thereby avoid performing the entirety of graphics processing pipeline 162. Rasterization stage 168 need not call shaders directly. Instead, GPU 160 may store rasterization results in a G-buffer of graphics memory 174. The rasterization results (also referred to as intermediate graphics data) may include color data, depth data, normal data (i.e., surface normal data), position data, identifier data, and the like.

In this manner, GPU 160 may perform a first portion of an image rendering process, to generate intermediate graphics data. The first portion of the image rendering process may include geometry processing stage 166 and rasterization stage 168 of graphics processing pipeline 162. GPU 160 may then store the intermediate graphics data in a G-buffer representation in graphics memory 174. The intermediate graphics data may include a shaded color component and a depth component. In some examples, the intermediate graphics data may further include any or all of a position component, a normals component, an albedo component, or a specular component for texture and/or depth information for a plurality of graphics objects (e.g., one or more graphics primitives). The position component may specify a position of a graphics object. The normals component may specify a local surface normal for the graphics object. The albedo component may specify surface reflectance for the graphics object. The specular component may specify a lighting highlight for the graphics object. In some examples, GPU 160 may compress the intermediate graphics data prior to sending the intermediate graphics data to GPU 190. In such examples, GPU 190 decompresses the intermediate graphics data prior to completing the rendering process.

GPU 190 receives the intermediate graphics data and buffers the intermediate graphics data in the G-buffer of graphics memory 192. Pixel processing pipeline 194 and texture engine 196 then perform a second portion of the image rendering process to render one or more images from the intermediate graphics data. For example, pixel processing pipeline 194 may execute one or more shaders, including a final shading pass, to render one or more images. The final shading pass may include rendering screen-sized quads, reading the G-buffer data, computing shader code, writing to a framebuffer of a device including GPU 190, and/or setting a depth complexity value equal to one.

In one example, GPU 190 is included in a virtual reality or augmented reality headset including two displays, a left-eye display and a right-eye display, e.g., as shown in FIG. 1. GPU 190 may be configured to generate (e.g., render and/or warp) two images of a stereoscopic image pair (a left-eye image and a right-eye image) from the intermediate graphics data. In some examples, GPU 190 may render a first image (e.g., a left-eye image), and then warp the first image to produce a second image (e.g., a right-eye image) from the first image. GPU 190 may use depth data of the intermediate graphics data to warp the first image to produce the second image. Alternatively, in some examples, GPU 190 may render a first image (e.g., a center image), and then use depth data to warp the first image into a left-eye image and a right-eye image.

In some examples, GPU 190 may perform image warping as an additional stage of the graphics processing pipeline (not shown in FIG. 2). For example, when CPU 152 executes software application 154, CPU 152 may generate tracking data to be used during the image warping stage. GPU 160 may send the tracking data to GPU 190 as part of the intermediate graphics data. GPU 190 may perform two rendering passes: a first pass to render a first image and a second pass to perform perspective texture mapping with new camera parameters defined by the tracking data and to generate a second image, where the first and second images define a stereoscopic image pair.

In this manner, system 100 of FIG. 1 and system 150 of FIG. 2 represent examples of a system including a first computing device comprising a first graphics processing unit (GPU) implemented in circuitry, and a second computing device comprising a second GPU implemented in circuitry, where the first GPU is configured to perform a first portion of an image rendering process to generate intermediate graphics data and send the intermediate graphics data to the second computing device, and where the second GPU is configured to perform a second portion of the image rendering process to render an image from the intermediate graphics data.

Figure 3:
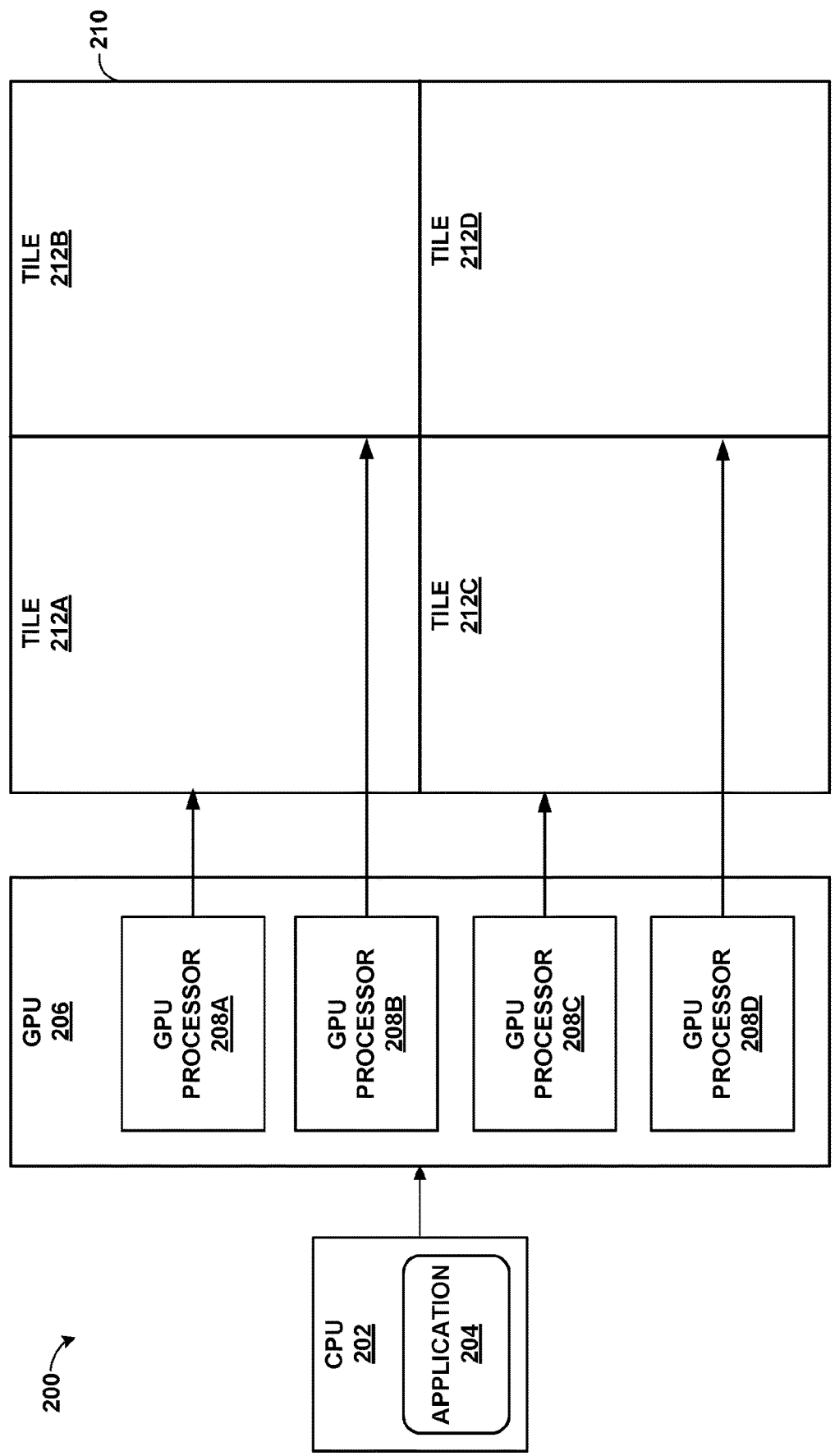
FIG. 3 is a conceptual diagram illustrating an example system for performing tiled rendering.

FIG. 3 is a conceptual diagram illustrating an example system 200 for performing tiled rendering. These techniques may also be referred to as deferred tiled rendering. System 200 includes CPU 202 and GPU 206. In this example, GPU 206 includes four GPU processors 208A-208D (GPU processors 208). In general, CPU 202 executes application 204, representing a graphics application, to generate graphics data. CPU 202 sends the graphics data to GPU 206 to render image 210 from the graphics data.

In this example, GPU 206 performs a tiled rendering process. That is, GPU 206 subdivides a screen of a display into four tiles 212A-212D (tiles 212), to generate respective tile portions of image 210. Thus, GPU 206 assigns one of GPU processors 208 to respective tiles 212. In this example, GPU processor 208A is assigned to tile 212A, GPU processor 208B is assigned to tile 212B, GPU processor 208C is assigned to tile 212C, and GPU processor 208D is assigned to tile 212D. In other examples, GPU 206 may include additional or fewer GPU processors, each of which may be assigned a respective tile.

In tiled rendering, CPU 202 may keep data for each of tiles 212 in fast local memory (not shown in FIG. 3). Typically, tiled rendering techniques are performed in the rasterization stage (e.g., during rasterization stage 168 of FIG. 2), because the 2D vertex projection has been determined by the time rasterization stage 168 occurs. In some examples, the tiled rendering process described with respect to FIG. 3 may be performed by devices configured to perform the techniques of this disclosure, e.g., server device 102 and VR headset device 120 of FIG. 1, and/or CPU 152 and GPUs 160, 190 of FIG. 2.

Figure 4:
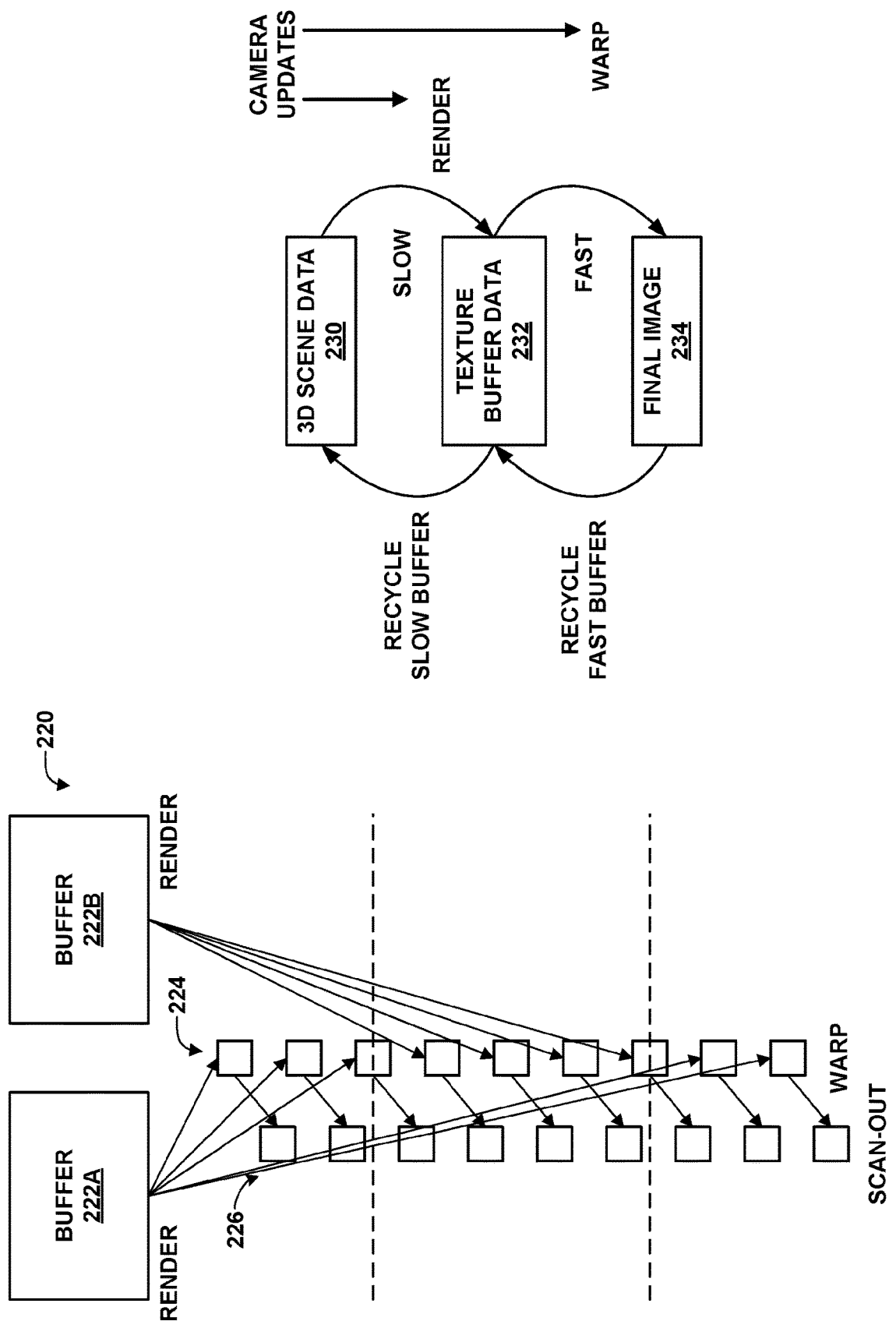
FIG. 4 is a conceptual diagram illustrating an example system for performing asynchronous image warping.

FIG. 4 is a conceptual diagram illustrating an example system 220 for performing asynchronous image warping. In asynchronous image warping, rendering of an image and display of the image may be decoupled. Asynchronous image warping may generally include two passes: a slow, first pass and a fast, second pass. During the slow, first pass, a GPU may render objects of 3D scene data 230 to texture buffer data 232 (also shown as a series of rendered images 224). The rendered image may be larger than a viewport to be displayed to a user. The GPU may store this image (or a portion of the image conforming to the viewport) to a first buffer, e.g., buffer 222A of FIG. 4, or a second buffer, e.g., buffer 222B of FIG. 4. During the second, fast pass, a GPU (the same GPU or a different GPU) may warp the rendered image (texture buffer data 232) to form final image 234 for a corresponding camera perspective (also shown as a series of warped images 226). The GPU may then scan the warped images out to framebuffer memory (not shown in FIG. 4).

Devices performing image warping with depth according to the techniques of this disclosure may use various warping techniques. For example, in basic warping, no actual depth data is determined, but instead, an arbitrary, constant depth value is assumed. As another example, the devices may perform warping with a depth buffer. In this example, the devices perform pixel-wise forward reprojection. This may lead to reprojection and/or disocclusion artifacts. In yet another example, the devices may perform warping with depth meshes. In this example, the devices perform per-pixel warping to reduce reprojection artifacts. To address disocclusion artifacts, the devices may tessellate the depth buffer and render with projective texture mapping. This may cause some distortion artifacts, in some examples.

Figure 5:
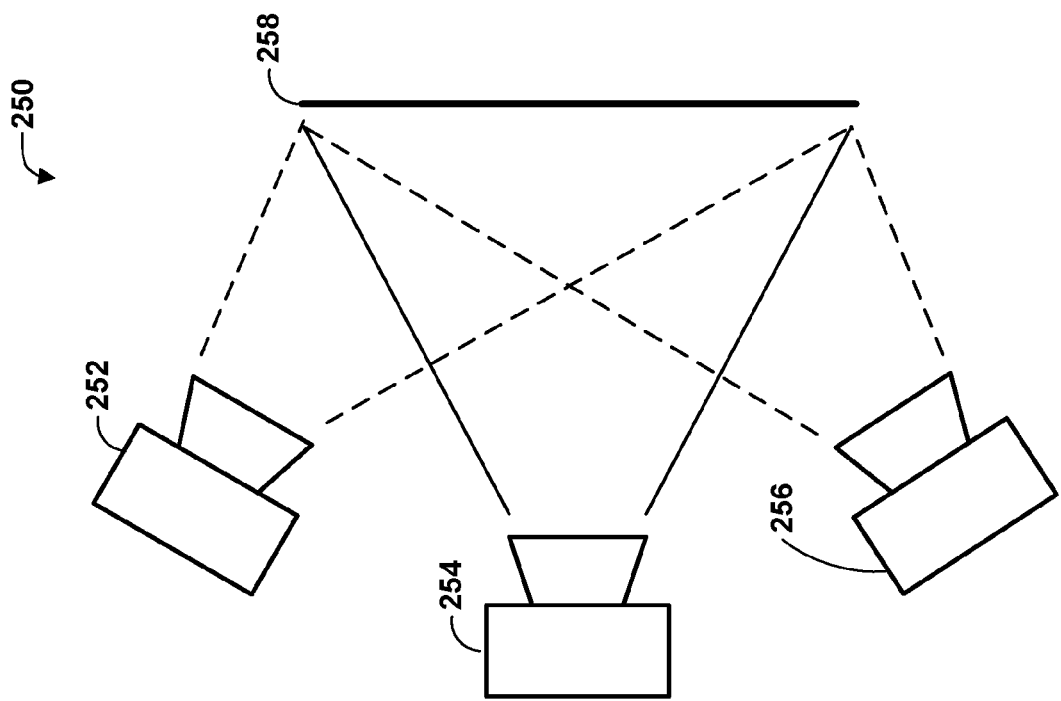
FIG. 5 is a conceptual diagram illustrating an example stereo warping process.

FIG. 5 is a conceptual diagram illustrating an example stereo warping process. In the example of FIG. 5, system 250 includes a variety of camera perspectives 252, 254, 256 from which data of a scene 258 is to be presented. In particular, a GPU may render an image from camera perspective 254. The GPU may then warp the rendered image to camera perspective 256 and to camera perspective 252. In this manner, rather than displaying the rendered image, the rendered image may be used only for warping, and the stereoscopic image pair that is ultimately displayed may include two images formed by warping the rendered image.

In some examples, devices of this disclosure (e.g., GPUs 110, 126 of FIG. 1 and/or GPUs 160, 190 of FIG. 2) may be configured to perform warping with view-dependent shading. In some cases, warping may lead to incorrect specular (view-dependent) shading. Thus, a device (e.g., a GPU or pre-compiler for a compiler that compiles a shader) may factor fragment shaders into diffuse and specular parts. The GPU may then render diffuse and specular parts into separate G-buffers. The GPU may further update the specular G-buffer more often than the diffuse G-buffer. In this manner, the devices of this disclosure may improve the specular (view-dependent) shading.

In addition, or in the alternative, devices of this disclosure (e.g., GPUs 110, 126 of FIG. 1 and/or GPUs 160, 190 of FIG. 2) may be configured to perform layered image warping. The devices may split a scene into a number N of depth layers, each depth layer having an associated depth value. The devices may render each depth layer into separate G-buffers. The devices may further assign graphics objects to the depth layers based on depth values of the graphics objects, e.g., such that each graphics object is assigned to the depth layer having the depth value that is closest to (most similar to) the depth value of the graphics object. Then, the devices may warp each of the depth layers from the G-buffers independently of the other layers. Performing layered image warping in this manner may increase flexibility of asynchronous warping. Independent moving objects can be assigned to different layers. This may result in reduction of disocclusion problems, since the final image can be filled from the various depth layers.

To define the depth layers, the application may insert begin/end layer marks into the graphical object stream (e.g., an OpenGL stream). A device may perform heuristic automatic separation of the graphical objects into various layers. The depth layers may be defined, for example, by grouping objects by depth. That is, each depth layer may include graphics objects having similar depth values, and each graphics object may be assigned to one of the layers.

Figure 6:
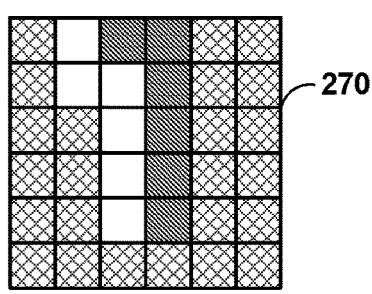
FIG. 6 is a conceptual diagram illustrating an example technique for performing red-green-blue and depth (RGBD) compression.
Figure 6:
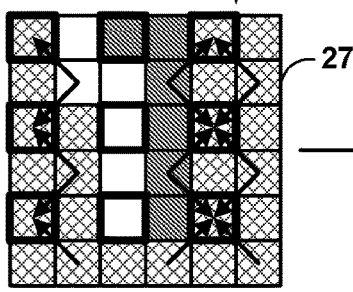
Figure 6:
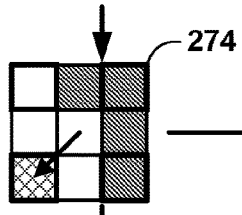
Figure 6:
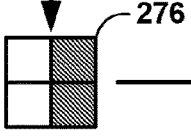
Figure 6:
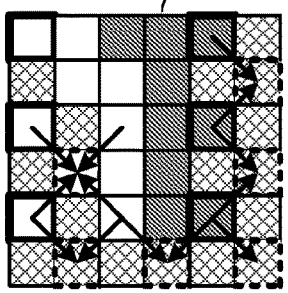
Figure 6:
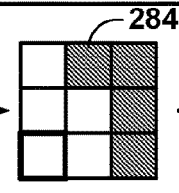
Figure 6:
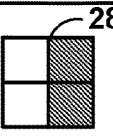
Figure 6:
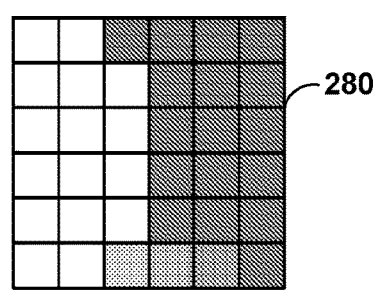
Figure 6:
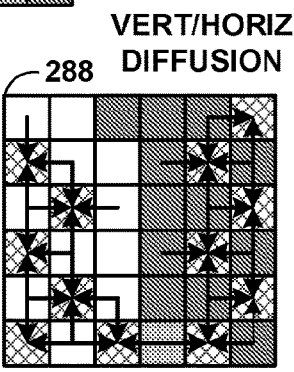
Figure 6:
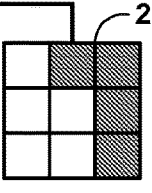
Figure 6:
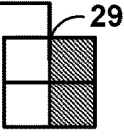

FIG. 6 is a conceptual diagram illustrating an example technique for performing red-green-blue and depth (RGBD) compression. In general, this compression scheme involves spreading samples stored on both sides of an edge in an image over the image, in two stages. In the first stage (the push stage), the image is downsampled. Block 270 may be downsampled by mathematically combining samples (pixels). For example, as shown in block 272, diagonally neighboring pixels may be averaged to form values for the pixels (squares) shown with heavier outlines than other pixels. In this manner, the example 6×6 block 272 may be downsampled to produce downsampled block 274. Crosshatch-shaded blocks represent empty pixels, which may be filled in this manner. Downsampled block 274 may be further downsampled to produce further downsampled block 276 in a similar manner.

In the second, pull stage, a GPU fills holes in coarse level images in finer scales. First, the GPU transfers the downsampled pixels of block 272 to block 282 and fills certain empty pixel values (outlined using dashed lines) by averaging values of diagonally neighboring pixels (shown using arrows) to produce block 288. The GPU then fills the remaining empty pixel values (shaded with crosshatching) by averaging values of horizontal and vertical neighboring pixels. The GPU may downsample blocks 282, 288 to produce downsampled blocks 284, 290, respectively. The GPU may further downsample blocks 284, 290 to produce further downsampled blocks 286, 292, representing compressed blocks. The GPU may perform this process for each of red, green, blue, and depth components of an image.

A server-side GPU (e.g., GPU 160 of FIG. 2) may compress color buffer data by rendering a color image at a lower resolution than a depth buffer and encoding the rendered image as low-bandwidth MPEG. The server-side GPU may compress depth buffer data by only keeping depth discontinuities and encoding incremental run-length data. To decompress the color data, a client-side GPU (e.g., GPU 190 of FIG. 2) may perform bilateral upsampling. To decompress the depth data, the client-side GPU may perform the push-pull diffusion process of FIG. 6 explained above.

Figure 7:
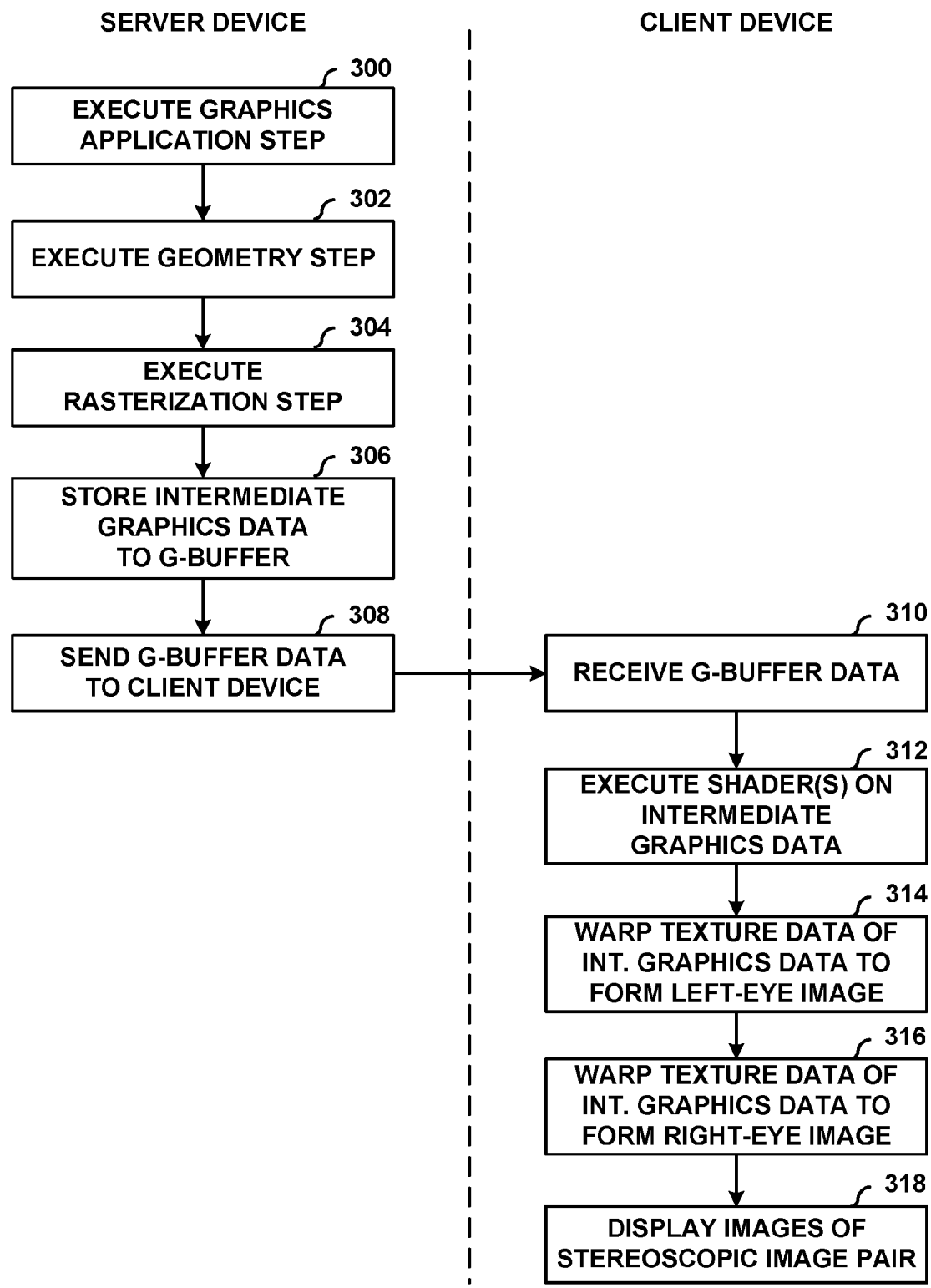
FIG. 7 is a flowchart illustrating an example process for rendering an image according to the techniques of this disclosure.

FIG. 7 is a flowchart illustrating an example process for rendering an image according to the techniques of this disclosure. The techniques of FIG. 7 are explained with respect to server device 102 and VR headset device 120 (an example of a client device) of FIG. 1. However, it should be understood that other components and devices, such as the various components of FIG. 2, may also be configured to perform the process of FIG. 7.

Initially, CPU 104 executes a graphics application as part of a graphics application step of a graphics processing pipeline (300). By executing the graphics application, CPU 104 generates graphics objects and/or graphics primitives to be further processed as part of the graphics processing pipeline. In some examples, CPU 104 may further generate tracking data to be used during an image warping stage of the graphics processing pipeline, as explained above, to warp a rendered image in order to form a stereoscopic image pair.

CPU 104 may provide the graphics objects and/or graphics primitives to graphics card 108. GPU 110 of graphics card 108 may then execute a geometry step (302) and a rasterization step (304) of the graphics processing pipeline, e.g., as explained above with respect to FIG. 2. However, rather than shading the rasterized image data (i.e., intermediate graphics data), GPU 110 may store the intermediate graphics data to a G-buffer (306), e.g., in memory 106. As explained above, the intermediate graphics data may include texture (color and/or illumination) data and depth data. In some examples, the intermediate graphics data may include any or all of normal data (i.e., surface normal data), position data, identifier data, or the like. In some examples, CPU 104 may assign the various graphics objects and/or graphics primitives to various layers (e.g., based on depth values of the graphics objects), and GPU 110 may render the graphics objects/primitives of each layer to a separate, respective G-buffer of memory 106.

GPU 110 and/or CPU 104 may then compress the intermediate graphics data as explained above with respect to FIG. 6 (not shown in FIG. 7). Server device 102 may then send the G-buffer data to the client device (VR headset device 120, in this example) (308). VR headset device 120 may then receive the G-buffer data (310), and if the G-buffer data is compressed, decompress the G-buffer data, as explained above.

GPU 126 of VR headset device 120 may then execute one or more shaders, including a final rendering pass, on the intermediate graphics data (312). The final rendering (or shading) pass may include warping texture data of the intermediate graphics data to form a left-eye image of a stereoscopic image pair (314) and warping the texture data of the intermediate graphics data to form a right-eye image of the stereoscopic image pair (316), using the depth data of the intermediate graphics data. In particular, the final rendering pass may include converting a single image into a stereoscopic image pair, performing time warping, and compensating for optics distortion of left-eye display 132 and right-eye display 134, all in a single pass. In other examples, GPU 126 may treat the texture data of the intermediate graphics data as a first image of a stereoscopic image pair, and warp the texture data of the intermediate graphics data to form a second image of the stereoscopic image pair. 5. VR headset device 120 may then display the images of the stereoscopic image pair (318), e.g., via left-eye display 132 and right-eye display 134.

In this manner, the method of FIG. 7 represents an example of a method including performing, by a first graphics processing unit (GPU) of a first computing device, a first portion of an image rendering process to generate intermediate graphics data, sending, by the first computing device, the intermediate graphics data to a second computing device, and performing, by a second GPU of the second computing device, a second portion of the image rendering process to render an image from the intermediate graphics data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating computer graphics, the method comprising:
receiving, by a first computing device, a plurality of sets of intermediate graphics data from a second computing device separate from the first computing device, wherein the sets of intermediate graphics data are generated by a first portion of an image rendering process performed by the second computing device for each of a plurality of depth layers, each of the sets of intermediate graphics data including rasterized graphics objects including unshaded source pixels having depth values corresponding to a respective depth layer of the plurality of depth layers; and
performing, by a GPU of the first computing device, a second portion of the image rendering process to render an image from the sets of intermediate graphics data, wherein performing the second portion of the image rendering process includes shading the unshaded source pixels of the intermediate graphics data to produce texture values for the unshaded source pixels.

2. The method of claim 1, wherein the first portion of the image rendering process includes performing at least a geometry step and a rasterization step of a graphics pipeline, and wherein performing the second portion of the image rendering process comprises performing a final rendering pass by the GPU, wherein the final rendering pass includes performing time warping and compensating for optics distortion of a display to be used to display the rendered image.

3. The method of claim 2, wherein performing the final rendering pass comprises storing shaded graphics data for the image to a framebuffer of the first computing device.

4. The method of claim 1, wherein the sets of intermediate graphics data comprising a shaded color component and a depth component, and the sets of intermediate graphics data from are received at a graphics buffer of the first computing device.

5. The method of claim 1, wherein the sets of intermediate graphics data are compressed.

6. The method of claim 1, wherein the sets of intermediate graphics data includes graphics data defining texture information and depth information, and wherein performing the second portion of the image rendering process to render the image comprises:
    warping the texture information using the depth information to produce a first image of a stereoscopic image pair; and
    warping the texture information using the depth information to produce a second image of the stereoscopic image pair.

7. The method of claim 6, wherein the first computing device comprises a virtual reality (VR) headset, the method further comprising:
    displaying, by the VR headset, the first image on a first display of the VR headset; and
    displaying, by the VR headset, the second image on a second display of the VR headset.

8. The method of claim 1, wherein the first portion of the image rendering process includes at least one of deferred tiled rendering or foveated rendering, wherein deferred tiled rendering comprises dividing the image into a plurality of tiles, and wherein foveated rendering comprises sampling pixels in the center of the image more densely than pixels in the periphery of the image.

9. The method of claim 1, wherein the first portion of the image rendering process includes,
    determining the depth values of the graphics objects on which the image rendering process is performed, and
    assigning each of the graphics objects to a respective depth layer of the plurality of depth layers based on the depth values, wherein each of the depth layers has an associated depth value.

10. A system for generating computer graphics, the system comprising:
    a first computing device comprising a graphics processing unit (GPU) implemented in circuitry, the first computing device configured to receive a plurality of sets of intermediate graphics data generated by a first portion of an image rendering process for each of a plurality of depth layers from a second computing device separate from the first computing device, each of the sets of intermediate graphics data including rasterized graphics objects including unshaded source pixels having depth values corresponding to a respective depth layer of the plurality of depth layers, and
    wherein the GPU is configured to perform a second portion of the image rendering process to render an image from the intermediate graphics data, wherein to perform the second portion of the image rendering process, the GPU is configured to shade the unshaded source pixels of the intermediate graphics data to produce texture values for the unshaded source pixels.

11. The system of claim 10, wherein the first portion of the image rendering process includes performing at least a geometry step and a rasterization step of a graphics pipeline, and
    wherein to perform the second portion of the image rendering process, the GPU is configured to perform a final rendering pass, wherein the final rendering pass includes time warping and compensating for optics distortion of a display to be used to display the rendered image.

12. The system of claim 11, wherein the first computing device further comprises a memory storing a framebuffer, and wherein to perform the final rendering pass, the GPU is configured to store shaded graphics data for the image to the framebuffer.

13. The system of claim 10, wherein the first computing device further comprising a graphics buffer to receive the sets of intermediate graphics data further including a shaded color component and a depth component.

14. The system of claim 10, wherein the sets of intermediate graphics data are compressed.

15. The system of claim 10, wherein the sets of intermediate graphics data includes graphics data defining texture information and depth information, and wherein the second portion of the image rendering process to render the image by the GPU includes:
    warp the texture information using the depth information to produce a first image of a stereoscopic image pair, and
    warp the texture information using the depth information to produce a second image of the stereoscopic image pair.

16. The system of claim 15, wherein the first computing device comprises a virtual reality (VR) headset comprising a first display and a second display, wherein the VR headset is further configured to:
    display the first image on the first display; and
    display the second image on the second display.

17. The system of claim 10, wherein the first portion of the image rendering process includes at least one of deferred tiled rendering or foveated rendering, wherein deferred tiled rendering comprises dividing the image into a plurality of tiles, and wherein foveated rendering comprises sampling pixels in the center of the image more densely than pixels in the periphery of the image.

18. The system of claim 10, wherein the first portion of the image rendering process includes,
    determining the depth values of the graphics objects on which the image rendering process is performed, and
    assigning each of the graphics objects to a respective depth layer of the plurality of depth layers based on the depth values, wherein each of the depth layers has an associated depth value.

19. A system for generating computer graphics, the system comprising:
    a first computing device, wherein the first computing device comprises:
        means for receiving a plurality of sets of intermediate graphics data from a second computing device separate from the first computing device, wherein the sets of intermediate graphics data are generated by a first portion of an image rendering process for each of a plurality of depth layers, each of the sets of intermediate graphics data including rasterized graphics objects including unshaded source pixels having depth values corresponding to a respective depth layer of the plurality of depth layers, and
        means for performing a second portion of the image rendering process of the GPU pipeline to render an image from the sets of intermediate graphics data, wherein the means for performing the second portion of the image rendering process includes means for shading the unshaded source pixels of the intermediate graphics data to produce texture values for the unshaded source pixels.

20. The system of claim 19, wherein the sets of intermediate graphics data includes graphics data defining texture information and depth information,
wherein the means for performing the second portion of the image rendering process comprises:
means for warping the texture information using the depth information to produce a first image of a stereoscopic image pair; and
means for warping the texture information using the depth information to produce a second image of the stereoscopic image pair; and
wherein the first computing device comprises a virtual reality (VR) headset comprising:
means for displaying the first image on a first display of the VR headset; and
means for displaying the second image on a second display of the VR headset.

21. A non-transitory computer-readable medium having stored thereon instructions that, when executed, cause a graphics processing unit (GPU) of a first computing device to:
receive a plurality of sets of intermediate graphics data from a second computing device separate from the first computing device, wherein the sets of intermediate graphics data are generated by a first portion of an image rendering process for each of a plurality of depth layers, each of the sets of intermediate graphics data including rasterized graphics objects including unshaded source pixels having depth values corresponding to a respective depth layer of the plurality of depth layers; and
perform a second portion of the image rendering process to render an image from the sets of intermediate graphics data, wherein the instructions that cause the processor to perform the second portion of the image rendering process include instructions that cause the processor to shade unshaded source pixels of the intermediate graphics data to produce texture values for the unshaded source pixels.

22. The non-transitory computer-readable storage medium of claim 21, wherein the first portion of the image rendering process comprises at least a geometry step and a rasterization step of a graphics pipeline, and wherein the instructions that cause the GPU to perform the second portion of the image rendering process comprise instructions that cause the GPU to perform a final rendering pass, wherein the final rendering pass includes time warping and compensating for optics distortion of a display to be used to display the rendered image.

23. The non-transitory computer-readable storage medium of claim 22, further comprising instructions that cause the GPU to store shaded graphics data produced during the final rendering pass to a framebuffer of the first computing device.

24. The non-transitory computer-readable storage medium of claim 21, wherein the instructions that cause the GPU to receive the sets of intermediate graphics data comprise instructions that cause the GPU to receive graphics buffer data, wherein the graphics buffer data comprises a shaded color component and a depth component.

25. The non-transitory computer-readable storage medium of claim 21, wherein the instructions that cause the GPU to receive the sets of intermediate graphics data comprise instructions that cause the GPU to receive compressed sets of intermediate graphics of the graphics buffer, further comprising instructions that cause the GPU to decompress the compressed sets of intermediate graphics of the graphics buffer.

26. The non-transitory computer-readable storage medium of claim 21, wherein the instructions that cause the GPU to receive the sets of intermediate graphics data comprise instructions that cause the GPU to receive graphics data defining texture information and depth information, and wherein the instructions that cause the GPU to perform the second portion of the image rendering process to render the image comprise instructions that cause the GPU to:
warp the texture information using the depth information to produce a first image of a stereoscopic image pair; and
warp the texture information using the depth information to produce a second image of the stereoscopic image pair.

27. The non-transitory computer-readable storage medium of claim 26, wherein the first computing device comprises a virtual reality (VR) headset, further comprising instructions that cause the VR headset to:
display the first image on a first display of the VR headset; and
display the second image on a second display of the VR headset.

28. The non-transitory computer-readable storage medium of claim 26,
wherein the instructions that cause the GPU to warp the texture information using the depth information to produce the first image comprise instructions that cause the GPU to determine the depth layers to which the graphics objects of the sets of intermediate graphics data are assigned based on the depth values for the graphics objects and warp graphics objects of each of the depth layers from a first camera perspective for the first image; and
wherein the instructions that cause the GPU to warp the texture information using the depth information to produce the second image comprise instructions that cause the GPU to determine depth layers to which the graphics objects of the sets of intermediate graphics data are assigned based on the depth values for the graphics objects and warp the graphics objects of each of the depth layers from a second camera perspective for the second image.

* * * * *